(12) United States Patent
Cook et al.

(10) Patent No.: US 8,026,632 B2
(45) Date of Patent: Sep. 27, 2011

(54) SYSTEM AND METHOD FOR EXPORTING A VEHICLE ON-BOARD AC POWER TO A SECOND VEHICLE

(75) Inventors: Anthony J. Cook, Fort Wayne, IN (US); Allen G. Renfrow, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 214 days.

(21) Appl. No.: 12/508,077

(22) Filed: Jul. 23, 2009

(65) Prior Publication Data

US 2011/0018339 A1 Jan. 27, 2011

(51) Int. Cl.
*B60L 1/00* (2006.01)
(52) U.S. Cl. .......................................... 307/10.1
(58) Field of Classification Search ............ 191/11; 340/431, 533; 307/9.1, 10.1; 320/109, 103, 320/104, 105
See application file for complete search history.

(56) References Cited

U.S. PATENT DOCUMENTS 3,431,428 A * 3/1969 Van Valer ................ 307/10.1
2006/0208873 A1* 9/2006 Lesesky et al. ............ 340/531
* cited by examiner

*Primary Examiner* — Jared Fureman
*Assistant Examiner* — Daniel Cavallari
(74) *Attorney, Agent, or Firm* — Jeffrey P. Calfa; Mark C. Bach; Gerald W. Askew

(57) ABSTRACT

A method for enabling a truck having an electrical system that can accept shore power to be supplied with shore power is provided. While the truck is stationary, an electric cable is connected between the truck's electrical system and an APU of a second truck that not only can deliver AC electricity to electrical loads in the second truck and also can export AC electricity as shore power. A condition precedent to enabling the APU to export AC electricity to the truck that can accept shore power is confirmed via a communication link between the two trucks. Upon confirmation of the condition, the APU is enabled to export AC electricity to the truck that can accept shore power.

14 Claims, 1 Drawing Sheet

SYSTEM AND METHOD FOR EXPORTING A VEHICLE ON-BOARD AC POWER TO A SECOND VEHICLE

TECHNICAL FIELD

This disclosure relates generally to electrical systems of motor vehicles, especially large motor vehicles like highway trucks that have auxiliary power units (APU's) for generating AC electric power.

BACKGROUND OF THE DISCLOSURE

The nature of the long haul trucking industry and certain governmental regulations impact professional truck drivers' lives in significant ways. A driver's rest or sleep time is one aspect of his/her life that is impacted.

A highway truck may be equipped with a sleeper cab that enables a driver to park a rig and then rest or sleep, or to allow one of a pair of companion drivers to do so while the other drives. To address personal needs of the driver and any companion, the cab may be equipped with various electrical accessories that provide useful conveniences during long haul runs. A driver and/or companion may also have their own personal accessories that are electrically operated and may run on household electricity, rather than on the DC battery bank voltage that is typically available in trucks.

In order to accommodate such personal accessories, and other on-board equipment that may also run on AC household electricity, a long haul truck may have either some type of device such as an inverter for converting DC battery bank voltage into 115 volt, 60 hertz, AC electricity, or an APU (auxiliary power unit) that generates 115 volt, 60 hertz, electricity. If a truck has neither, it may instead have to rely on connecting to an off-board power grid when stationary at a location such as a truck stop that has such a grid. If a truck stop where the truck stops has no such grid, the driver and/or companion cannot use electric AC devices or appliances in the truck.

If an on-board inverter is operating to supply AC power while the truck is being driven, the battery bank can be kept charged by an engine-driven charging system. If the inverter is operating to supply electricity while the truck is stationary, battery bank charge will be drawn down unless the engine is idling to keep the charging system operating.

An APU typically operates at times when the engine that propels the truck is shut off. Electrical loads that use AC electricity from the APU therefore do not deplete battery bank charge. Because most highway trucks are propelled by engines that use diesel fuel, the engine of a typical APU is a diesel engine that draws diesel fuel from the existing fuel tanks in the truck.

An APU diesel engine may power an electric generator that develops typical household AC voltage at regulated 115 VAC, 60 hertz. Electrical devices and accessories, many of which would be considered common household accessories, can be plugged into receptacles in a truck sleeper compartment that are connected to the regulated AC voltage. The regulated AC voltage can also be used to maintain the truck's battery bank charge as needed while the engine in the powertrain that propels the truck is not running.

Various APU models are commercially available from different manufacturers. However, certain trucks that have sleeper cabs may not have an on-board source of regulated AC voltage, such as an APU or an inverter. Even if such a truck lacking an APU were to have an inverter, the inverter might be unable to supply all the demands of in-cab conveniences that run on household electricity.

Those demands may only be met when the truck is stationary at a location such as at a truck stop where the truck's electrical system can be plugged into a receptacle that supplies household AC electricity. Such a source of electricity is sometimes referred to as "shore power", and such a truck is said to be capable of accepting "shore power".

SUMMARY OF THE DISCLOSURE

Embodiments disclosed herein relate to a method and a system for supplying power to a truck. One embodiment provides a method for enabling a first truck having an electrical system that can accept shore power to be supplied with shore power. The first truck is parked. While the first truck is stationary, an electric cable is connected between an electrical system and an APU of a second truck that not only can deliver AC electricity to electrical loads in the second truck but also can export AC electricity as shore power. Via a communication link between the first truck and the second truck, a condition precedent to enabling the APU to export AC electricity to the first truck that can accept shore power is confirmed. Upon confirmation of the condition precedent, the APU is enabled to export AC electricity to the first truck that can accept shore power.

Another embodiment provides a system for supplying AC electricity to an electrical system of a first stationary truck whose power train engine is shut off from a second stationary truck whose power train engine is also shut off. The system comprises an electric cable for connecting the electrical system of the first stationary truck with an APU on the second stationary truck that is delivering AC electricity to an electrical system of the second stationary truck to enable the APU to concurrently deliver AC electricity to the first stationary truck. A data communication link is provided between the electrical system of the first stationary truck and the electrical system of the second stationary truck for confirming a condition precedent to enabling the APU to export AC electricity to the first stationary truck, and for enabling the APU to export AC electricity to the first stationary truck upon confirmation of the condition precedent.

DETAILED DESCRIPTION

Figure 1:
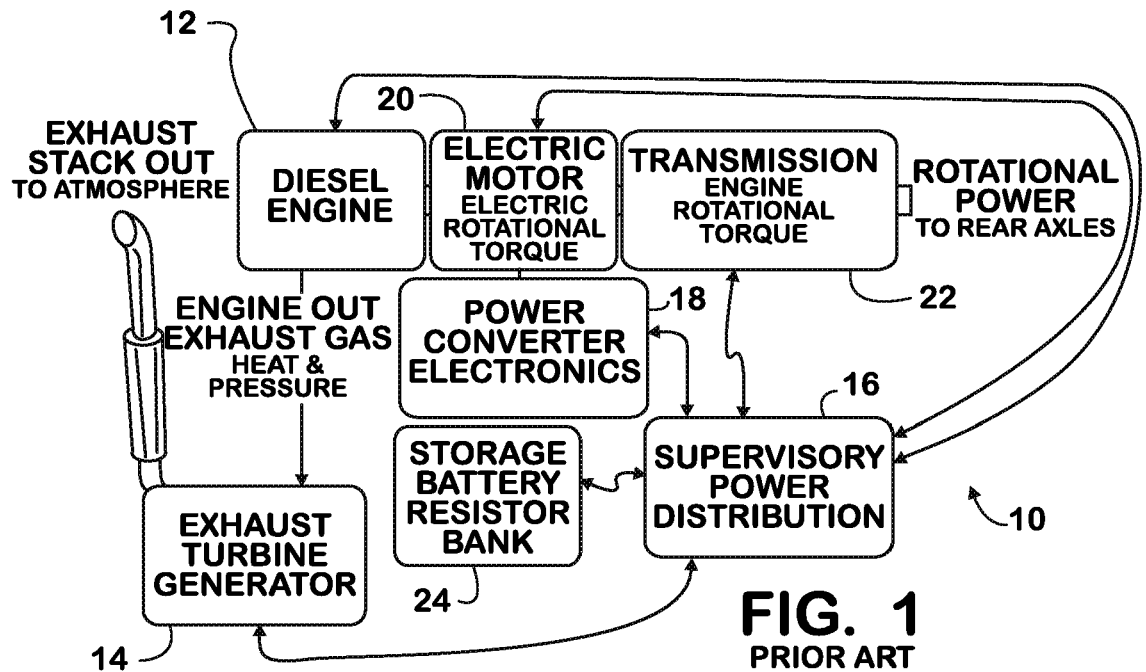
FIG. 1 is a schematic diagram showing a top plan view of two highway trucks utilizing the disclosed system and method for enabling one to supply the other with household AC electricity.

FIG. 1 shows highway tractors 10, 12 and respective trailers 14, 16 stationary side-by-side. Each tractor has its own powertrain for propelling itself while towing the respective trailer. Each also has a respective electrical system that includes a DC portion and an AC portion.

The AC portion includes at least one receptacle for accepting a plug of an AC device or appliance so that AC electricity can be delivered to the device or appliance. The at least one receptacle may be located in a sleeper compartment at the rear of the tractor cab to allow a driver or companion to use personal household devices that run on household electricity but not on DC electricity. In this way the driver or companion need not purchase DC devices that operate only when DC is available, such as in the tractor.

Tractor 10 comprises an APU (auxiliary power unit) 18 that has the ability not only to deliver AC electricity to a device or appliance that is plugged into an AC receptacle in tractor 12, but also to export AC electricity from the tractor as shore power. A typical APU comprises an AC generator driven by an auxiliary diesel engine.

Tractor 12 has the ability to import and accept shore power for use by an AC electrical device or appliance that is plugged into an AC electrical receptacle 20 in tractor 12.

For tractor 10 to export shore power from APU 18 to supply the AC portion of the electrical system of tractor 12, a cable 22 is connected between the two tractors. Cable 22 may be carried by one or the other of the two tractors and have one termination that is fixed to the respective tractor and an opposite termination that can be separably associated with the other tractor, i.e. plugged into and out of a receptacle on the other tractor. Alternately, the cable may have plugs at both terminations that are respectively plugged to receptacles in the respective tractors. A typical cable may have two insulated power-carrying conductors and a ground conductor.

A communications link is also established between the two tractors. Such a link may be a wired link, a wireless link, or a combination of both. It may be in the cable itself. The purpose of the link is to provide a medium via which the existence of certain conditions precedent to enabling APU 18 to export AC electricity to tractor 12 are confirmed. Any one or more of several specific conditions may be used as such conditions precedent.

Figure 2:
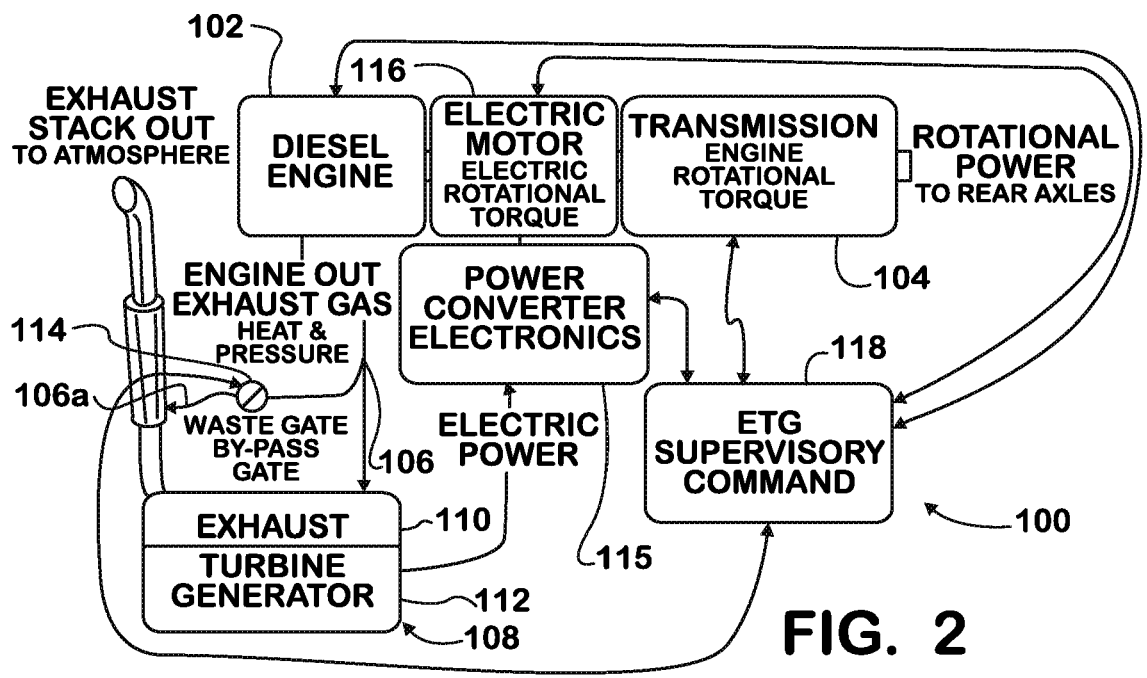
FIG. 2 is a diagram of steps in the method.

FIG. 2 shows steps in an example of a method for exporting shore power from tractor 10 to tractor 12. A first step 24 is starting the engine that drives the generator of APU 18. Once the generator is developing rated voltage, a step 26 of connecting cable 22 occurs, a step that is typically performed by hand.

Next a step 28 monitors for the existence of certain specified conditions precedent to allowing power to be exported from APU 18 to tractor 12. When a step 30 determines that the specified conditions exist, then the voltage output of the APU generator is conducted through conductors in cable 22 to the AC electrical system in tractor 12.

Conditions precedent may include confirmation that a respective park brake in each truck is disclosing that it is in an applied condition, and confirmation that a respective transmission in a powertrain of each truck is disclosing that it is in a disengaged condition. In each instance, confirmation is typically indicated by an appropriate sensor associated with the respective device. A processor in the electrical system of tractor 10 reads confirming data on a data link in the electrical system of the first truck, such as a J1939 data link, and it also reads confirming data on its own data link.

By having one tractor equipped with an APU and another capable of accepting shore power from the APU via the method that has been described, both tractors can avoid running their powertrains' engines when stationary.

What is claimed is:

1. A method for enabling a first truck having an electrical system that can accept shore power to be supplied with shore power, the method comprising the steps of:
    parking the first truck, and while the first truck is stationary, connecting an electric cable between an electrical system and an APU of a second truck that not only can deliver AC electricity to electrical loads in the second truck but also can export AC electricity as shore power;
    confirming, via a communication link between the first truck and the second truck, a condition precedent to enabling the APU to export AC electricity to the first truck that can accept shore power; and
    upon confirmation of the condition precedent, enabling the APU to export AC electricity to the first truck that can accept shore power.

2. The method as set forth in claim 1 in which the step of confirming, via a communication link between the first truck and the second truck, the condition precedent to enabling the APU to export AC electricity to the first truck that can accept shore power comprises confirming that each of the first truck and the second truck are stationary by a device in each of the first truck and the second truck disclosing that a respective truck is stationary.

3. The method as set forth in claim 2 in which the step of confirming that both the first truck and the second truck are stationary by the device in each of the first truck and the second truck disclosing that the respective truck is stationary comprises confirming that a park brake in each of the first truck and the second truck is in an applied condition.

4. The method as set forth in claim 3 in which the step of confirming, via a communication link between the first truck and the second truck, the condition precedent to enabling the APU to export AC electricity to the first truck that can accept shore power includes confirming that a transmission in a power train of the first truck is in a disengaged condition.

5. The method as set forth in claim 1 in which the step of confirming, via a communication link between the first truck and the second truck, the condition precedent to enabling the APU to export AC electricity to the first truck that can accept shore power comprises confirming that a transmission in a power train of the second truck is in a disengaged condition.

6. The method as set forth in claim 1 further comprising the step of:
    measuring a quantity of electric shore power exported by the second truck.

7. The method as set forth in claim 6 further comprising the steps of:
    calculating a price for the quantity of electric shore power exported by the second truck; and
    billing the price to an owner/operator of the first truck.

8. The method as set forth in claim 1 in which the step of confirming, via a communication link between the first truck and the second truck, the condition precedent to enabling the APU to export AC electricity to the first truck that can accept shore power comprises a processor in second truck reading confirming data on a data link in the electrical system of the first truck.

9. A system for supplying AC electricity to an electrical system of a first stationary truck whose power train engine is shut off from a second stationary truck whose power train engine is also shut off, the system comprising:
    an electric cable for connecting the electrical system of the first stationary truck with an APU on the second stationary truck that is delivering AC electricity to an electrical system of the second stationary truck to enable the APU to concurrently deliver AC electricity to the first stationary truck; and
    a data communication link between the electrical system of the first stationary truck and the electrical system of the second stationary truck for confirming a condition precedent to enabling the APU to export AC electricity to the first stationary truck, and for enabling the APU to export AC electricity to the first stationary truck upon confirmation of the condition precedent.

10. The system as set forth in claim 9 in which the condition precedent includes a device in both the first stationary truck and the second stationary truck disclosing that each of the first stationary truck and the second stationary truck, respectively, are stationary.

11. The system as set forth in claim 10 in which the device comprises a park brake in each of the first stationary truck and the second stationary truck.

12. The system as set forth in claim 11 in which the condition precedent further includes a transmission in a power train in each of the first stationary truck and the second stationary truck in a disengaged condition.

13. The system as set forth in claim 9 in which the second stationary truck comprises a device for measuring a quantity of electric shore power exported by the second stationary truck to the first stationary truck.

14. The system as set forth in claim 9 in which the data communication link is through the electric cable.

\* \* \* \* \*